K. RIDDLE.
FLAT TIRE ALARM.
APPLICATION FILED FEB. 28, 1920. RENEWED AUG. 8, 1921.
1,396,284.
Patented Nov. 8, 1921.
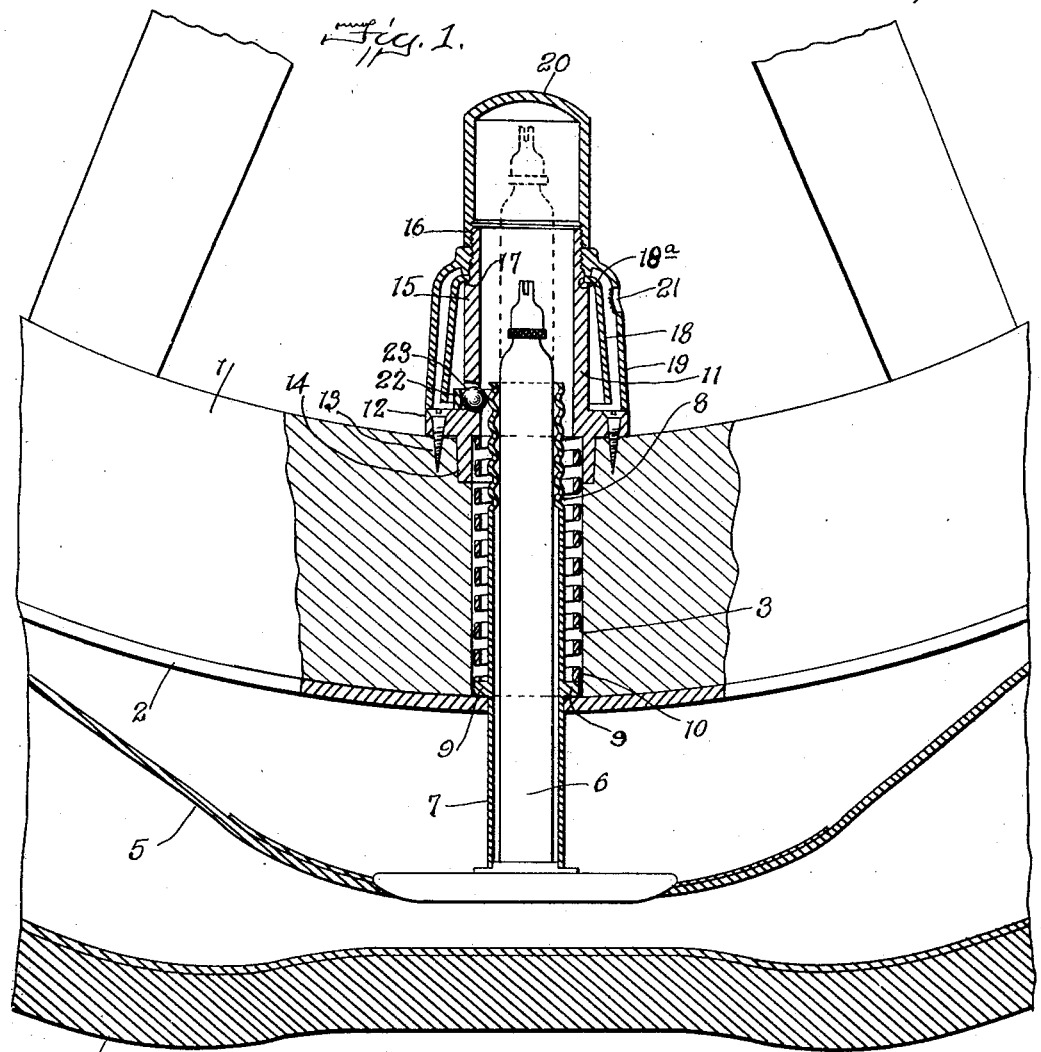
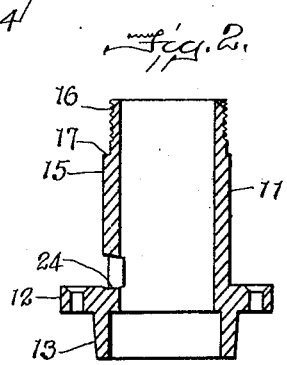
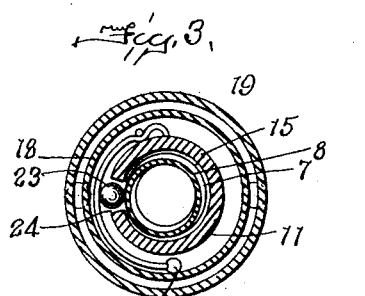
Inventor
Karl Riddle,
By Toulmin & Toulmin,
Attorneys

UNITED STATES PATENT OFFICE.

KARL RIDDLE, OF WEST PALM BEACH, FLORIDA.

FLAT-TIRE ALARM.

1,396,284.  Specification of Letters Patent.  Patented Nov. 8, 1921.

Application filed February 28, 1920, Serial No. 362,024. Renewed August 8, 1921. Serial No. 490,808.

*To all whom it may concern:*

Be it known that I, KARL RIDDLE, a citizen of the United States, residing at West Palm Beach, in the county of Palm Beach and State of Florida, have invented certain new and useful Improvements in Flat-Tire Alarms, of which the following is a specification, reference being had therein to the accompanying drawing.

This invention relates to flat tire alarms, and has for its particular object to provide an improved tire alarm which may be applied to standard pneumatic tire mountings without material change in the regular construction thereof and which will be effective to indicate deflation or under inflation of the tire by operating an alarm which will be heard by the operator of the machine.

A feature of the invention consists in providing a tire alarm and operating mechanism therefor which may be applied in connection with the inner tube valve stem without effecting any changes in the stem and having none of its operable parts in direct contact with compressed air of the tube.

It is a feature of the invention to provide tire alarm mechanism adapted to be applied to the rim and felly of the wheel through the same aperture that receives the valve stem under the usual arrangement of mounting pneumatic tires, the aperture being enlarged somewhat to admit the additional parts of the alarm.

Thus an inexpensive connection of the alarm to the valve stem, and rim and felly of the wheel is made, only a few simple parts being required to effect the mounting. The alarm mechanism comprises a housing and dust cap for the valve stem, is very compact and of small dimensions and presents a neat appearance as applied to the felly of the wheel.

Use of the tire alarm in connection with the valve stem does not interfere with inflating the tires, the dust cap being removed and the air tube connected direct to the valve stem in the usual manner, no other parts of the mechanism being affected by the operation.

There is no external contact of the alarm mechanism at any time relative to the ground or otherwise in the operation of the wheel equipped therewith. Thus the mechanism is entirely removed from contact with the surface over which the wheel travels and its operation therefore is in nowise affected by mud, sand, gravel, etc., with which the wheel comes in contact.

Furthermore, the normal operation of the device is not interfered with by the irregular movement of the wheel when slipping or traveling through ruts. When inflation of the tire is within the required limits of pressure operation of the wheel under all kinds of extreme road conditions will not result in operating the alarm, but when the tire is under-inflated the alarm mechanism is both sensitive and positive in its response to the increased depression of the tire.

Mechanically the improved device consists of a few substantial parts which are simple and cheap to manufacture, easily applied to a wheel and tire and which will not readily be rendered out of adjustment by rough operation of the wheels.

In the drawings:

Figure 1 is a detail longitudinal section taken through the felly rim and tire of a wheel to which the improved tire alarm has been applied, the device being shown in vertical section; and, Figs. 2 and 3 are detail views of the parts comprised in the alarm mechanism.

As shown in Fig. 1, as herein explained, the tire alarm is applied direct to the felly 1 and rim 2 of the wheel, the mounting being effected through the aperture 3 in the rim and felly which receives the valve stem in the usual method of mounting pneumatic tires, the aperture as here shown being enlarged somewhat to receive the additional parts of the tire alarm mechanism.

The tire as here shown consists of the usual casing 4 and inner tube 5, the tube having the usual valve stem 6 adapted to extend through the aperture 3 and project beyond the inner surface of the felly in the usual manner.

The alarm mechanism consists of a plunger tube 7 which is adapted to freely telescope the valve stem, the lower end of the tube resting upon the valve stem base at its point of connection with the inner tube. The plunger tube is somewhat shorter than the valve stem, thus enabling making of the usual connection to the stem to inflate the tire. The upper end of the tube is corrugated or provided with a series of alternate annular ridges and depressions 8, the purpose and operation of which will presently be described.

Secured to the plunger tube substantially below its middle portion is a peripheral shoulder or collar 9, which is adapted to move freely with the plunger in the aperture 3, and which rests on the steel rim 2 when the tire is deflated. A compression spring 10 is mounted to freely telescope the plunger 7 within the aperture 3, being seated at its lower end on the shoulder 9 of the plunger and contacting at its upper end substantially flush with the inner surface of the felly with a shoulder of the main housing 11 of the device.

The housing 11 has a base or flange portion 12 whereby the same is secured to the felly by means of screws 13. A lower sleeve or cup portion 14 of the housing is secured in the felly and receives the end of the compression spring 10, the aperture 3 being counter-bored at its upper end to receive the projecting part 14. Thus the spring 10 is at all times confined between the base of the housing and the shoulder 9 of the plunger.

The upper portion of the housing consists of a sleeve 15 extending upwardly from the base a considerable distance but having its upper end substantially below the projecting end of the valve stem to permit of convenient connection to the stem to inflate the tire. The upper end of the sleeve 15 is threaded as at 16 and is provided with a shoulder 17 which is adapted to support a bell 18; the bell having a central aperture 18ᵃ adapted to pass freely over the thread end of the sleeve to seat the bell on the shoulder 17. The lower edge of the bell is flared outwardly to some extent and is slightly above the base 12 of the housing 11.

An outer casing 19 is threaded onto the inner housing 11 to inclose the bell and the housing, the lower edge of the casing being adapted to be drawn down tight against the base 12; a dust cap 20 being secured to the projecting end of the threaded portion 16 of the housing 11 thus effecting practically a complete dust and moisture-proof casing for the tire alarm mechanism. Apertures 21 are provided in the casing 19 to permit the sound of the bell to pass therethrough.

The bell mechanism consists of the bell 18, a bell striker 22 secured to the housing 11, a ball 23 operable in a ball race 24 provided in the housing 11, and the corrugated end of the plunger tube 7.

When the tire is inflated within the required limits the pressure of the inner tube will overcome the pressure of the spring 10 and will be sufficient to project the plunger tube and valve stem upwardly and maintain their uppermost position as indicated by the dotted line positions in Fig. 1, within variations that will prevent operation of the bell mechanism. Thus when inflation of the tires is within the required limits the alarm mechanism will be neutralized or inoperative so far as its effect upon the bell is concerned.

When the pressure or inflation of the tires falls below the established minimum of pressure the pressure of the spring will react on the inner tube and will cause the plunger to depress the wall thereof to increasing extent as the air pressure within the tube decreases as may be caused by a puncture, leaking valve, or gradual escape of air through the walls or junctures of the tube. The plunger will thus descend in the aperture 3, its upper end being brought into operable contact with the ball 23.

Thus, with the up and down movement of the plunger, caused by the compression and expansion of the tire adjacent the alarm device, as the tire contacts with and rises from the ground with the rotation of the wheel, the ball will be actuated by the corrugated end of the plunger, which will in turn actuate the bell striker, thus producing the alarm indicating the deflated condition of the tire.

It will be understood, of course, that the tension of the spring 10 is balanced against the pressure of the inflated inner tube. When the inflation is within normal limits, the pressure of the tube against the plunger will be greater that the resistance of the spring. The tube therefore will be expanded to its full capacity within the casing and the plunger will be maintained in its upper zone out of operative range with the bell. However, when the air pressure in the tube falls below the minimum of normal pressure the resistance or pressure of the spring will be greater than the resistance or pressure of the tube, thus permitting the plunger, with the expansion of the spring, to descend in the housing 11 and aperture 3 until operative relation with the bell mechanism is established. The bell will be actuated twice in rapid succession upon each rotation of the wheel, first when the tire adjacent the alarm mechanism contacts with the ground, the compression of the tire forcing the plunger upwardly and actuating the bell, and again with the expansion of the tire as it leaves the ground at that point which will permit the plunger to descend again under the action of the spring, thus actuating the bell the second time.

To mount a tire on a wheel equipped with the tire alarm, the wheel is turned until the valve aperture is at the top of the wheel, according to the usual practice in mounting pneumatic tires, the casing is then lifted above the rim of the wheel and the valve stem is entered in the tube 7. The weight of the tire and pressure of the inner tube will press the tube down against the resistance of the spring 10 until the projecting end of the tube is substantially flush with the outer face of the rim, the mounting of the tire in all other respects being according to common practice. Where clencher tires are used the valve stem is inserted in the tube 7, pressure of the spring forcing the tube back so that the inner tube can be inserted in the casing.

From the foregoing detailed description the construction, application and operation of the improved tire alarm will be readily understood. It is obvious, of course, that modifications of details of construction can be made without departing from the principle and spirit of the invention as defined in the appended claims.

Having thus fully described my invention, what I claim as new and desire to secure by Letters Patent, is:—

1. In a device of the character described the combination, with a pneumatic tire mounted on a wheel in the usual manner, with the valve stem extending through an aperture in the rim and felly of the wheel, of a tube having a series of alternate ribs and grooves formed at its upper end, said tube being operable in said aperture and having its lower end supported on the base of the valve stem and a sound producing mechanism coöperating with the upper end of the tube whereby movement of the tube due to the action of the valve stem will operate the sound producing mechanism.

2. In a device of the character described the combination, with a pneumatic tire mounted on a wheel in the usual manner, with the valve stem extending through an aperture in the rim and felly of the wheel, of a tube having a series of alternate ribs and grooves formed at its upper end, said tube being operable in said aperture and having its lower end supported on the base of the valve stem, and a bell and bell actuating mechanism comprising a ball having operative relation with said upper end of the tube whereby movement of the tube due to the action of the valve stem will operate the sound producing mechanism.

3. In a device of the character described the combination, with a pneumatic tire mounted on a wheel in the usual manner, with the valve stem extending through an aperture in the rim and felly of the wheel, of a tube having a series of alternate ribs and grooves formed at its upper end, said tube being operable in said aperture and having its lower end supported on the base of the valve stem, a bell and bell actuating mechanism comprising a ball having operative relation with said upper end of the tube, whereby movement of the tube due to the action of the valve stem will operate the sound producing mechanism, and a housing and a dust and moisture-proof casing for said mechanism.

4. In a device of the character described the combination, with a pneumatic tire mounted on a wheel in the usual manner, with the valve stem extending through an aperture in the rim and felly of the wheel, of a tube having a series of alternate ribs and grooves formed at its upper end, said tube being operable in said aperture and having its lower end supported on the base of the valve stem, and a bell and bell actuating mechanism comprising a ball having operative relation with said upper end of the tube, whereby movement of the tube due to the action of the valve stem will operate the sound producing mechanism, and a housing secured to the felly of the wheel and arranged telescopically relative to said plunger casing for said mechanism.

5. In a tire alarm device the combination with the valve stem of the inner tube extending through an aperture of the rim and felly of a wheel, a tube arranged telescopically of the valve stem and having operable relation with the inner tube, and an alarm mechanism coöperating with said tube.

6. In a device of the character described, the combination with a pneumatic tire mounted on a wheel in the usual manner with the valve stem extending through an aperture in the rim and felly of the wheel, of a member having operative relation with the inner tube of said tire, a spring acting to force said member toward the inner tube whereby when inflation of the tube is below normal pressure, said member will act to depress the tube, and sound producing mechanism coöperating with said member, whereby movement of the member in either direction due to the alternate action of the inner tube and said spring will operate the sound producing mechanism.

In testimony whereof, I affix my signature.

KARL RIDDLE.